J. GRAHAM.
GAS METER SEAL.
APPLICATION FILED JAN. 3, 1910.
986,818.
Patented Mar. 14, 1911.
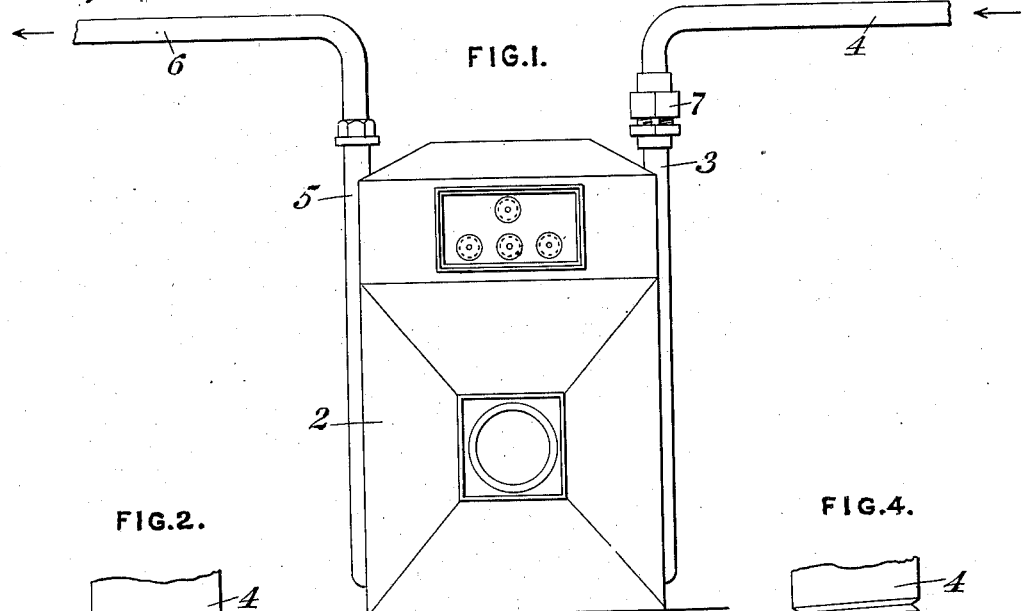
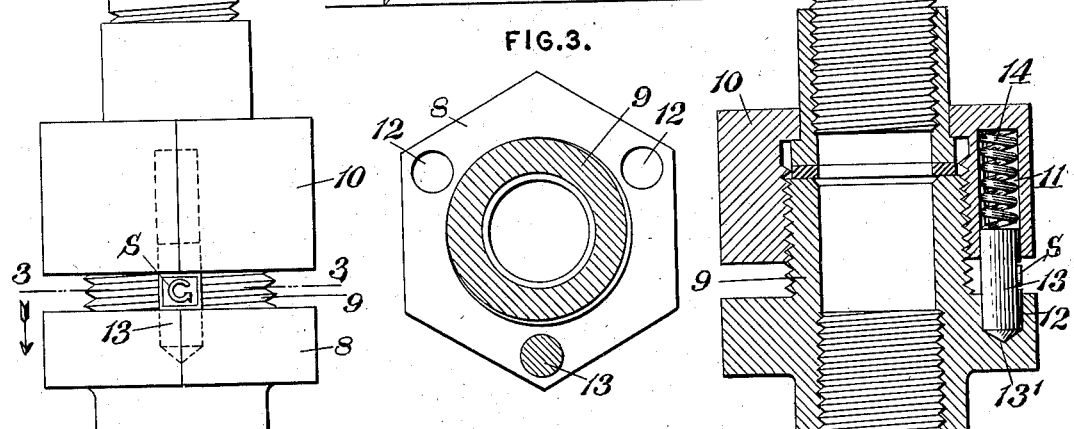
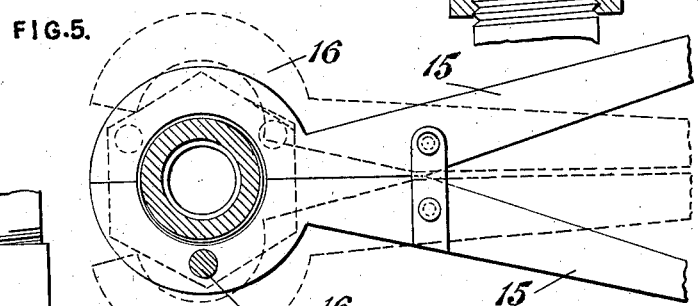
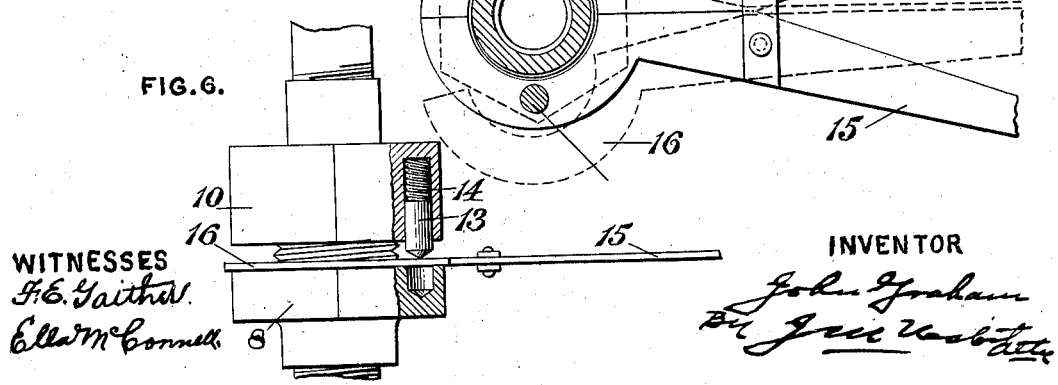
WITNESSES
INVENTOR

UNITED STATES PATENT OFFICE.

JOHN GRAHAM, OF SWISSVALE, PENNSYLVANIA, ASSIGNOR OF ONE-THIRD TO JOHN W. GRAHAM, OF SWISSVALE, PENNSYLVANIA.

GAS-METER SEAL.

986,818.

Specification of Letters Patent. Patented Mar. 14, 1911.

Application filed January 3, 1910. Serial No. 535,966.

*To all whom it may concern:*

Be it known that I, JOHN GRAHAM, a resident of Swissvale, in the county of Allegheny and State of Pennsylvania, have invented certain new and useful Improvements in Gas-Meter Seals, of which the following is a specification.

This invention relates to an efficient locking seal for the union or coupling which connects a gas main with the inlet side of a meter, the purpose being to provide a lock which must of necessity be destroyed before the coupling can be disconnected.

The loss of considerable gas through the dishonesty of patrons is a condition well recognized by all gas companies, and while various appliances have been proposed for preventing thefts, none seem to meet all requirements, and as a general rule no seal whatever is used. The union or coupling which connects the inlet tube or pipe with the meter is the vulnerable point. It can be readily disconnected and the gas shunted around the meter, the meter connection being restored whenever inspection is likely to occur.

The invention herein provides a locking seal which locks the union parts together in such manner that it is absolutely necessary to destroy the lock before the meter can be disconnected. This applies as well to the employees of the gas company as to the customer, so that by utilizing the locking member as a seal it will be apparent that substitute keys and seal-manipulating devices are rendered quite useless, a complete destruction of the seal member being necessary before any person can disconnect the meter.

The invention is embodied in a spring projected pin carried in the recess in one of the union parts which enters a recess in the other part, the pin and the recesses being of like cross-section, so that the recesses are completely closed and no opportunity is presented for forcing the pin into disconnecting position. In connection with this embodiment, the invention includes means for holding the pin out of locking engagement while coupling is being made, so that no inconvenience is experienced in making the connection.

In the accompanying drawings, Figure 1 is an elevation of a usual type of meter having the inlet or supply pipe connected thereto with the improved locking and seal-forming union. Fig. 2 is an elevation of the union on a larger scale, and Fig. 3 is a sectional plan on line 3—3 of Fig. 2. Fig. 4 is a vertical section of the same. Figs. 5 and 6 are details illustrating means for holding the seal-forming pin out of locking position while the union is being turned up.

Referring to the drawings, 2 indicates the meter, provided with inlet tube 3 to which is connected the gas supply tube or pipe 4 leading from the main.

5 is the outlet tube of the meter and 6 the service tube or pipe connected thereto.

7 is the union which connects tubes 3 and 4, and it is to this union that the invention has particular reference. Union 7 is of usual design, and consists of head 8 on tube 3, from which projects the externally threaded extension 9 to receive nut 10 having a swivel mounting on the extremity of pipe 4. With the union thus described the connection is made and tightened up in a manner substantially the same as unions usually used for this purpose.

In applying the improved locking seal, head 8 and nut 10 are formed with recesses in their adjacent end faces which are adapted to register with each other, a spring projected seal-forming pin being held in one of the recesses and adapted to enter the other recess, bridging the slight space between the head and nut and forming a barrier against turning either part with relation to the other which can be removed only by cutting the pin, the recesses being open only through the end faces of the head and nut.

In the present embodiment, the recess 11 in nut 10 is deeper than the head recess 12, and entered in recess 11 is pin 13, while within said recesses and behind the pin is the stout expansible spring 14. Head 8 may be provided with several recesses or sockets 12 in the path of pin 13 as the latter moves around when screwing up nut 10, three such recesses being here shown, so that when the nut has been made quite tight, only a fraction of a further turn is necessary to bring the pin in register with one or another of the sockets into which it is forced by the spring. The extremity of the pin may be pointed at 13′ to facilitate entering one or another of the sockets.

It is characteristic of the invention that recesses 11 and 12 are open only at the adjacent end faces of the nut and head, there being no side, top, or bottom key holes or other openings through which a tool might be inserted for manipulating the locking pin. The length of the pin is such as to lie in both recesses, and being of the same cross section as the recesses the latter are completely closed. The sealing pin may be provided with a seal mark, as shown at S, which is exposed in the space separating the nut and head of the union. It is the purpose to form the locking pin of steel, and after the connection has been once made the only possible way of loosening the union is by cutting or sawing the pin, destroying it and the seal.

When applying the union the locking pin may be held out of engagement with the several recesses 12 by a convenient form of hand tool shown in Figs. 5 and 6, the same consisting of two hand operated arms 15, pivoted together like a pair of pliers, and having semi-circular plate like extremities 16 which embrace the union between head 8 and nut 10 and cover recesses 12. After the nut is turned up about as tight as is desired the tool is opened, as in dotted lines in Fig. 5, and removed when the pin is free to enter the next recess encountered.

I claim:

1. The combination of a meter provided with an inlet tube, a supply tube, one of said tubes provided with a head and a threaded extension, a nut swiveled on the other tube and adapted to unite with said threaded extension, the nut and head formed with alining recesses open only through their adjacent faces, and a spring-projected seal forming pin spanning the space between the nut and head and lying in both recesses.

2. In a seal-forming coupling, the combination of two tubes to be coupled, a nut rotatable on one of the tubes, and a threaded extension on the other tube adapted to be engaged by the nut, a head on said other tube at the base of the threaded extension, recesses in the head and nut open only through their adjacent end faces, a pin lying in both recesses, said pin provided with a seal mark intermediate the head and nut.

3. The combination of the gas inlet tube of a gas meter provided with a head, a supply pipe leading to said tube, a coupling nut for connecting the supply and meter tubes, the coupling nut and said head having recesses open only through their adjacent faces, a seal-forming locking pin projected from one recess across the space between the head and nut and into the other recess, and a spring holding the pin normally projected.

4. The combination of the gas inlet tube of a gas meter provided with a head, a supply pipe leading to said tube, a coupling nut for connecting the supply and meter tubes, the coupling nut and said head having recesses open only through their adjacent faces, one of said recesses being deeper than the other, a spring in the deeper recess, a seal forming pin fitting the deeper recess and adapted to be retracted against the pressure of the spring when turning up the nut, the pin being of such length as to lie in both recesses when released with the recesses in register, the pin extending across the space between the head and nut and being held projected by said spring.

5. The combination of the inlet tube of a gas meter, a head on said tube, a gas supply tube, a nut rotatable on the latter and adapted to connect with the meter tube with a space separating the head and nut, the adjacent end faces of the head and nut formed with recesses open only through said faces, a spring projected pin lying in both recesses and across the space separating the head and nut, the pin provided with a seal mark exposed in the space between the head and nut.

6. In a seal-forming union, the combination of two tubes to be united by the union, a head carried by one tube and a coupling nut carried by the other tube, the end faces of the head and nut formed with depressions, a spring projected pin in one of the depressions adapted to enter the other depression when in register therewith, and a device adapted to be interposed between the head and nut when making the union for holding the pin out of locking position until the union is made.

7. In a seal-forming union, two tubes united by the union, a head carried by one of the tubes, and a coupling nut rotatably held on the other tube, the adjacent faces of the head and nut formed with recesses, a spring projected pin in one of the recesses adapted to enter the other recess when in register therewith, and two arms pivotally united and having curved extensions for embracing the union between the head and nut and holding the pin out of the locking position until the nut is turned up.

In testimony whereof I affix my signature in presence of two witnesses.

JOHN GRAHAM.

Witnesses:
J. M. NESBIT,
ELLA MCCONNELL.